(12) United States Patent
Sugimoto et al.

(10) Patent No.: US 6,215,529 B1
(45) Date of Patent: Apr. 10, 2001

(54) GAMMA COMPENSATION APPARATUS

(75) Inventors: Hiroko Sugimoto, Hirakata; Atsuhisa Kageyama, Ibaraki; Masahiro Takeshima; Minoru Kawabata, both of Takatsuki, all of (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/035,695

(22) Filed: Mar. 5, 1998

(30) Foreign Application Priority Data

Mar. 6, 1997 (JP) .................................................. 9-051337

(51) Int. Cl.$^7$ ............................ H04N 5/202; H04N 9/20; H04N 9/64; H04N 9/69
(52) U.S. Cl. ......................... 348/675; 348/254; 348/255; 348/256; 348/674; 348/675; 348/676; 348/677; 358/456; 358/500
(58) Field of Search .................................. 348/254, 255, 348/256, 674, 675, 676, 677; 358/456, 500

(56) References Cited

U.S. PATENT DOCUMENTS

| | | | |
|---|---|---|---|
| 4,489,349 | * 12/1984 | Okada | 358/168 |
| 4,884,128 | * 11/1989 | Hieda | 358/29 |
| 4,903,121 | * 2/1990 | Uomori | 358/41 |
| 5,089,890 | * 2/1992 | Takayama | 358/164 |
| 5,345,265 | * 9/1994 | Kim | 348/254 |
| 5,481,317 | * 1/1996 | Hieda | 348/674 |
| 5,512,948 | * 4/1996 | Iwamatsu | 348/255 |
| 5,565,931 | * 10/1996 | Girod | 348/675 |
| 5,671,023 | * 9/1997 | Nishiwaki et al. | 348/675 |
| 5,684,533 | * 11/1997 | Ishii | 348/254 |
| 5,710,594 | * 1/1998 | Kim | 348/254 |
| 5,745,172 | * 4/1998 | Miyashita | 348/241 |
| 5,764,287 | * 6/1998 | Tatsumi | 348/254 |
| 5,818,521 | * 10/1998 | Hieda | 348/222 |
| 5,864,370 | * 1/1999 | Knox et al. | 348/674 |
| 5,933,199 | * 8/1999 | Yoon | 348/674 |
| 6,023,533 | * 2/2000 | Sano et al. | 382/274 |
| 6,040,860 | * 3/2000 | Tamura et al. | 348/252 |

FOREIGN PATENT DOCUMENTS

| | | |
|---|---|---|
| 55-135492 | 10/1980 | (JP) . |
| 2-81572 | 3/1990 | (JP) . |
| 6-105326 | 4/1994 | (JP) . |

\* cited by examiner

Primary Examiner—Reinhard Eisenzopf
Assistant Examiner—Brian P. Yenke
(74) Attorney, Agent, or Firm—Ratner & Prestia

(57) ABSTRACT

Aiming to improve color reproducibility of a red part having high color saturation, a gamma compensation apparatus of the present invention is composed of a bending point setting block 100a and a gamma compensation block 101a and bending point setting block 100a is composed of a high APL detection circuit 1a inputting an average picture level of an input luminance signal and for detecting and taking out a signal component higher than a designated level; a gain controller 2a for gain controlling the detected signal at the high APL picture detection circuit; and an adder 3a for adding a designated offset to the output of gain controller 2a, and gamma compensation block 101a is composed of a slice circuit 4a inputting a color difference signal (R-Y) and the output of bending point setting block 100a and taking out a color difference signal component higher than the output signal level of bending point setting block 100a; a gain controller 5a for adjusting the output level of slice circuit 4a; and a subtracter 6a for subtracting the output of gain controller 5a from the input color difference signal (R-Y) and outputting a gamma compensated color difference signal (R-Y)'.

6 Claims, 8 Drawing Sheets

GAMMA COMPENSATION APPARATUS

FIELD OF THE INVENTION

The present invention relates to a gamma compensation apparatus used in a color television receiver.

BACKGROUND OF THE INVENTION

Television receivers having a high additional value have been developed and color television receivers having image quality correction circuit such as gamma compensation is desired.

In usual color television receivers, only a luminance signal Y is gamma compensated and chrominance signals are not gamma compensated. Accordingly, usual color television receivers have a problem that a red color with high saturation is not correctly reproduced in its tone, so-called "tone crush of a red color" occurs and color reproducibility is not good.

SUMMARY OF THE INVENTION

To solve the above problem, a gamma compensation apparatus of the present invention used in a color television receiver includes:

a high APL detection circuit, being supplied with an average picture level (APL) of a luminance signal and for taking out a signal component higher than a designated level;

a first gain controller for controlling a level of the signal taken out at the high APL detection circuit;

an adder for adding a designated offset to the output of the first gain controller and setting a compensation starting point of gamma characteristic;

a slice circuit, being supplied with a color difference signal (R-Y) and the output signal of the adder and for slicing the color difference signal (R-Y) according to the output signal of the adder;

a second gain controller for reducing the output level of the slice circuit by a predetermined rate; and a subtracter for subtracting the output signal of the second gain controller from the color difference signal (R-Y);

and is characterized by improving color reproducibility of a red part of a color difference signal (R-Y) with high color saturation.

PREFERRED EMBODIMENTS OF THE INVENTION

Figure 1:
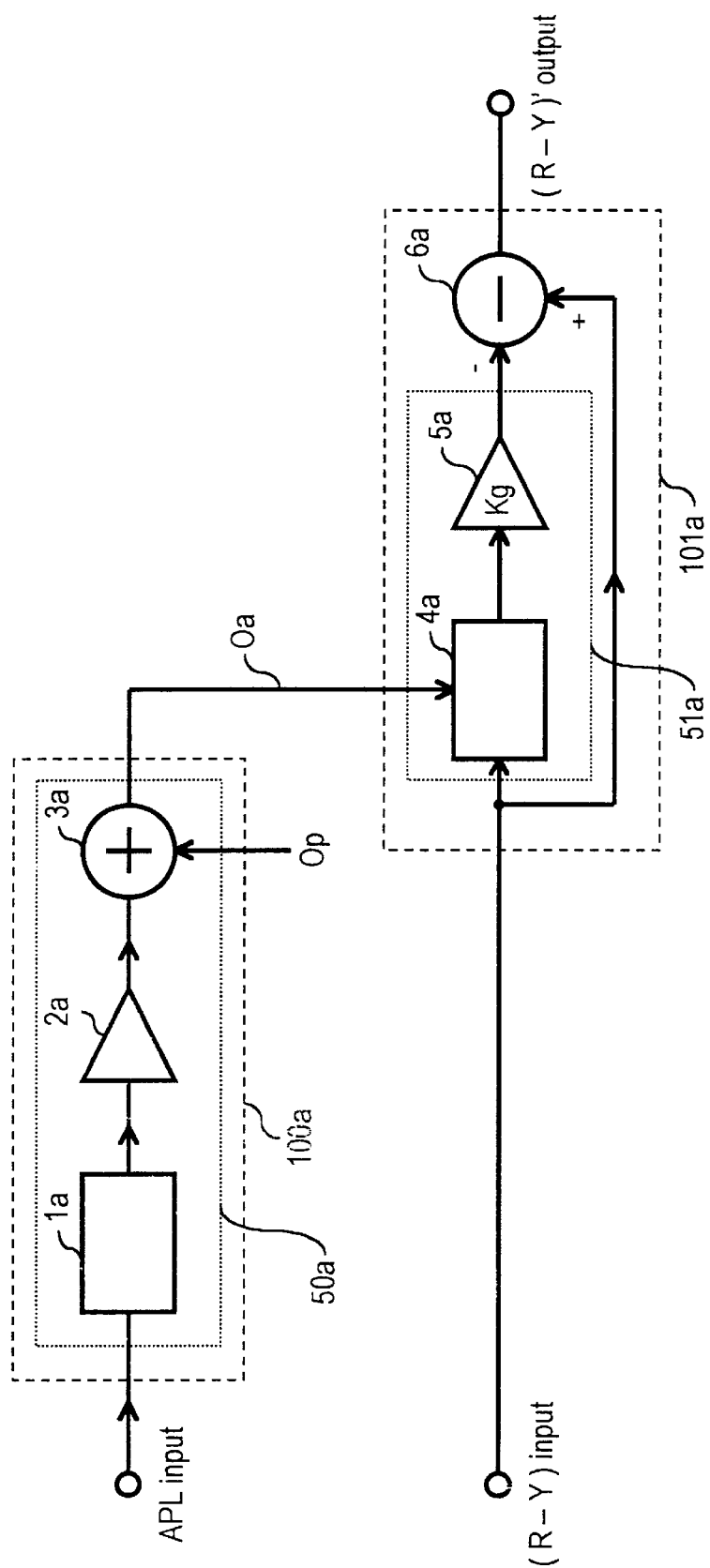
FIG. 1 is a block diagram of a gamma compensation apparatus in accordance with a first exemplary embodiment of the present invention (in the case of a bent line having one bending point in a gamma compensation characteristic).

Exemplary embodiments of the present invention are explained below, referring to the drawings.

First exemplary embodiment

FIG. 1 is a block diagram of a gamma compensation apparatus having a gamma characteristic made of two straight lines with one bending point in accordance with an exemplary embodiment of the present invention.

A bending point calculation block 50$a$ is composed of a high APL detection circuit 1$a$, a gain controller 2$a$ and an adder 3$a$. High APL detection circuit 1$a$ is supplied with an average picture level (APL) signal, e.g. a mean value of the luminance signal during a field period, and subtracts a designated level Lp from the supplied signal and has a kind of slice function to output the value corresponding to 0 (zero) when the subtracted output is negative and output the input signal as it is when the subtracted output is positive.

Figure 2:
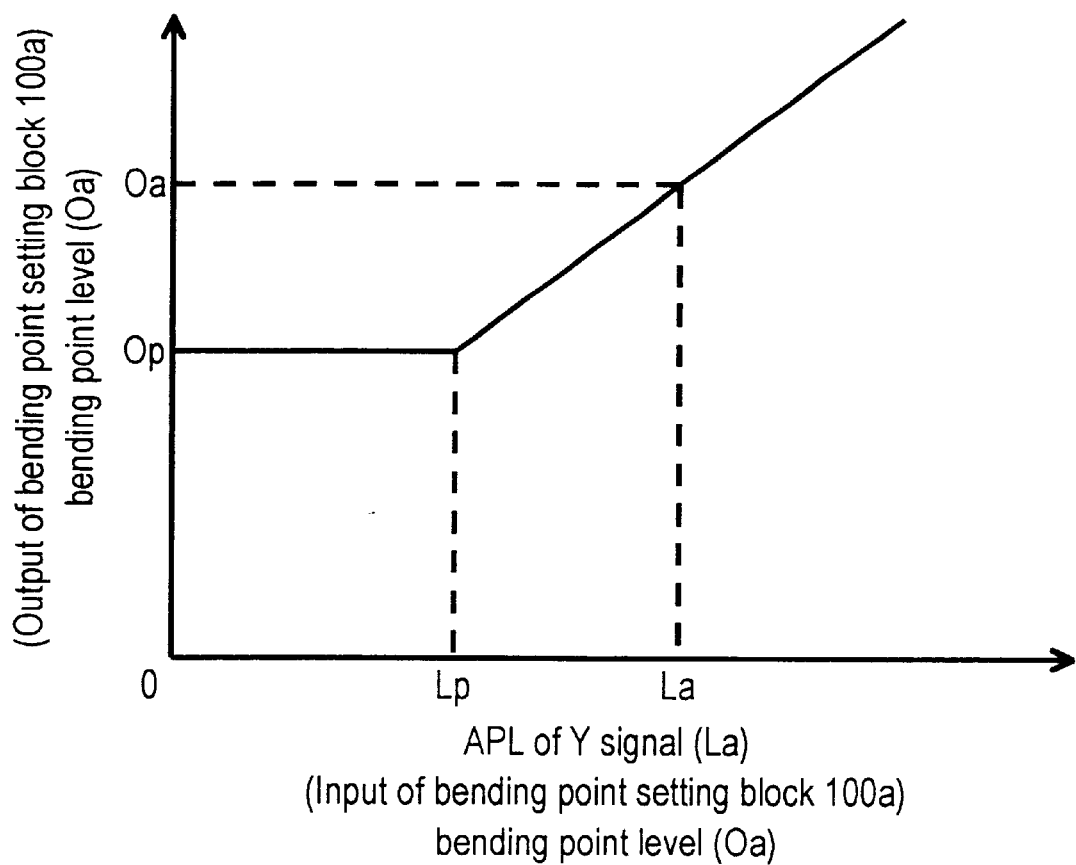
FIG. 2 shows a setting characteristic of a bending level against APL.

Gain controller 2$a$ decreases the output of high APL detection circuit 1$a$ by a predetermined rate. Adder 3$a$ adds an offset Op to the output signal of gain controller 2$a$ and outputs it. Bending point calculation block 50$a$ determines a bending level Oa which is a level to start gamma compensation according to an input APL signal and outputs it. To relate to an explanation of second and third exemplary embodiments, bending point calculation block 50$a$ is also named bending point setting block 100$a$. The input-output characteristic of bending point calculation block 50$a$ is that the output becomes offset value Op which is manually set when the input APL is lower than a designated level Lp an input-output is shown by a straight line increasing according to the input signal level, making the offset value Op a starting point when the input APL is lower than the designated level Lp, as shown in FIG. 2.

A compensation calculation block 51$a$ includes a slice circuit 4$a$ and gain controller 5$a$. Slice circuit 4$a$ subtracts an output signal of bending point setting block 100$a$ from the input color difference signal (R-Y) and outputs the value corresponding to 0 (zero) when the subtracted signal is negative and outputs the input signal as it is when the subtracted signal is positive. Gain controller 5$a$ multiplies the output of slice circuit 4$a$ by a coefficient Kg (0<Kg<1)and outputs the product.

Gamma compensation block 101$a$ is composed of a compensation value calculation block 51$a$ and a subtracter 6$a$.

Figure 3:
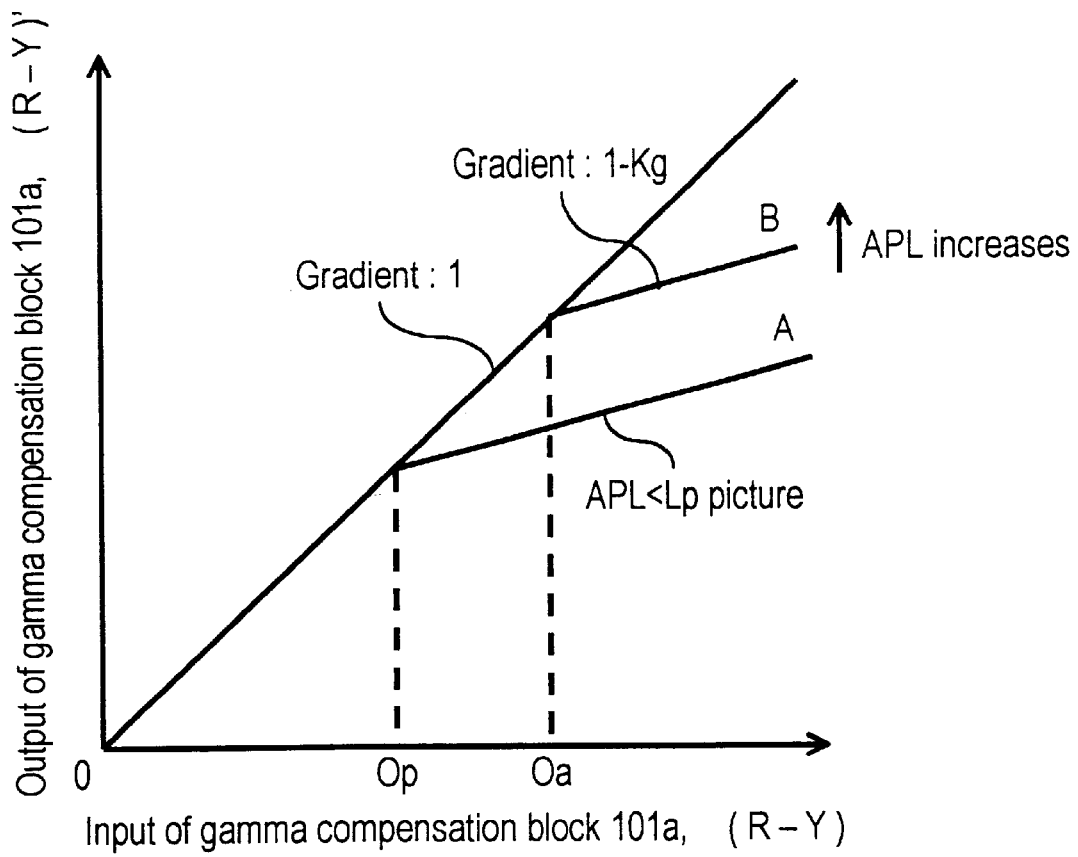
FIG. 3 shows an input-output characteristic of a gamma compensation apparatus having one bending point in accordance with the first exemplary embodiment of the present invention.

Subtracter 6$a$ subtracts an output of compensation value calculation block 51$a$, that is the output of gain controller 5$a$ from the input color difference signal (R-Y). An input-output characteristic of gamma compensation block 101$a$ is that the input color difference signal (R-Y) is output as it is when the input color difference signal (R-Y) is lower than bending point level Oa and the gradient of the characteristic decreases when the input color difference signal (R-Y) is higher than bending point level Oa, as shown in FIG. 3. Thus, a gamma compensated signal (R-Y)' for a red color signal is output from gamma compensation block 101a. Because the bending point comes to a set point Op for a picture in which the APL is lower than a designated level Lp, an input-output characteristic of gamma compensation block 101a is expressed by a bent line A shown in FIG. 3 and the characteristic moves upwards from bent line A to bent line B according to the deviation of the APL of a picture from the designated level Lp. If the gain of gain controller 5a is Kg, the gradient of the gamma compensated characteristic is expressed by (1-Kg).

The level Lp is a level to be set and the level Oa moves according to the content of a picture (APL value). If the picture APL is lower than the set APL (Lp), the bending point comes to point Op (FIG. 2), the input-output characteristic of gamma compensation block 101a is expressed by bent line A shown in FIG. 3. If the picture APL is higher than the set APL (Lp), for example level La, the bending point comes to point Oa (FIG. 2), the input-output characteristic of gamma compensation block 101a is expressed by bent line B shown in FIG. 3. The larger the APL value of a picture, the more the bending point moves upperward, that is the bent part of bent line A moves upward. It is because the smaller the APL of a picture, that is the darker the entire picture is, the more the tone crush of red color is remarkable and on the contrary, a picture having a large APL value appears as an unnatural picture, unless the gammna compensation is relaxed.

Thus, the tone crush of a red part is prevented and color reproducibility of a red part with high saturation in a displayed picture can be improved by suppressing the level of a red part with high saturation of a color difference signal (R-Y).

Second exemplary embodiment

Figure 4:
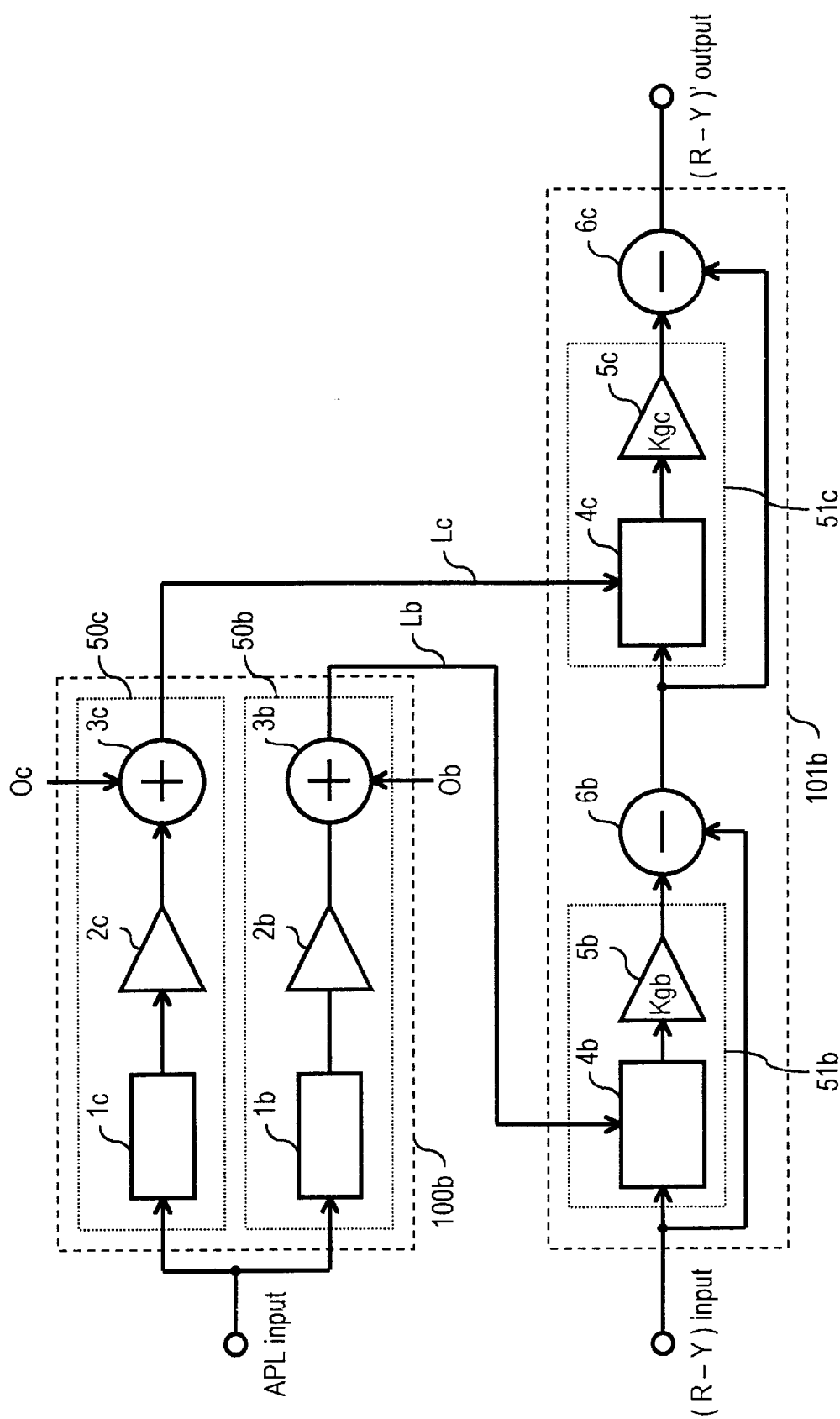
FIG. 4 is a block diagram of a gamma compensation apparatus in accordance with a second exemplary embodiment of the present invention (in the case of a bent line having two bending points in a gamma compensation characteristic).

A block diagram of a gamma compensation apparatus in accordance with a second exemplary embodiment of the present invention is shown in FIG. 4. The second exemplary embodiment is characterized by a gamma compensation characteristic which is composed of three continuous lines having two bending points and the apparatus is composed of two pairs of a bending point calculation block, compensation value calculation block and a subtracter. A first bending point calculation block 50b is composed of a high APL detection circuit 1b, a gain controller 2b and an adder 3b. A second bending point calculation block 50c is composed of a high APL detection circuit 1c, a gain controller 2c and an adder 3c. A combination of first bending point calculation block 50b and second bending point calculation block 50c is named a bending point setting block 100b. High APL detection circuits 1b and 1c; gain controllers 2b and 2c and adders 3b and 3c work in the same way as high APL detection circuit 1a, a gain controller 2a and an adder 3a of the first exemplary embodiment, respectively. Therefore, first bending point calculation block 50b and second bending point calculation block 50c also work in the same way as bending point calculation block 50a of the first exemplary embodiment.

First compensation value calculation block 51b is composed of a slice circuit 4b and a gain controller 5b and second compensation value calculation block 51c is composed of a slice circuit 4c and a gain controller 5c. Slice circuits 4b and 4c; gain controllers 5b and 5c and subtracters 6b and 6c work in the same way as slice circuit 4a, a gain controller 5a and a subtracter 6a of the first exemplary embodiment, respectively.

Gains of gain controllers 5b and 5c are made Kgb and Kgc, respectively and both Kgb and Kgc are larger than 0 and smaller than 1.

A gamma compensation block 101b is composed of a first compensation value calculation block 51b, a subtracter 6b, a second compensation value calculation block 51c and a subtracter 6c and corresponds to gamma compensation block 101a of the first exemplary embodiment.

Figure 5:
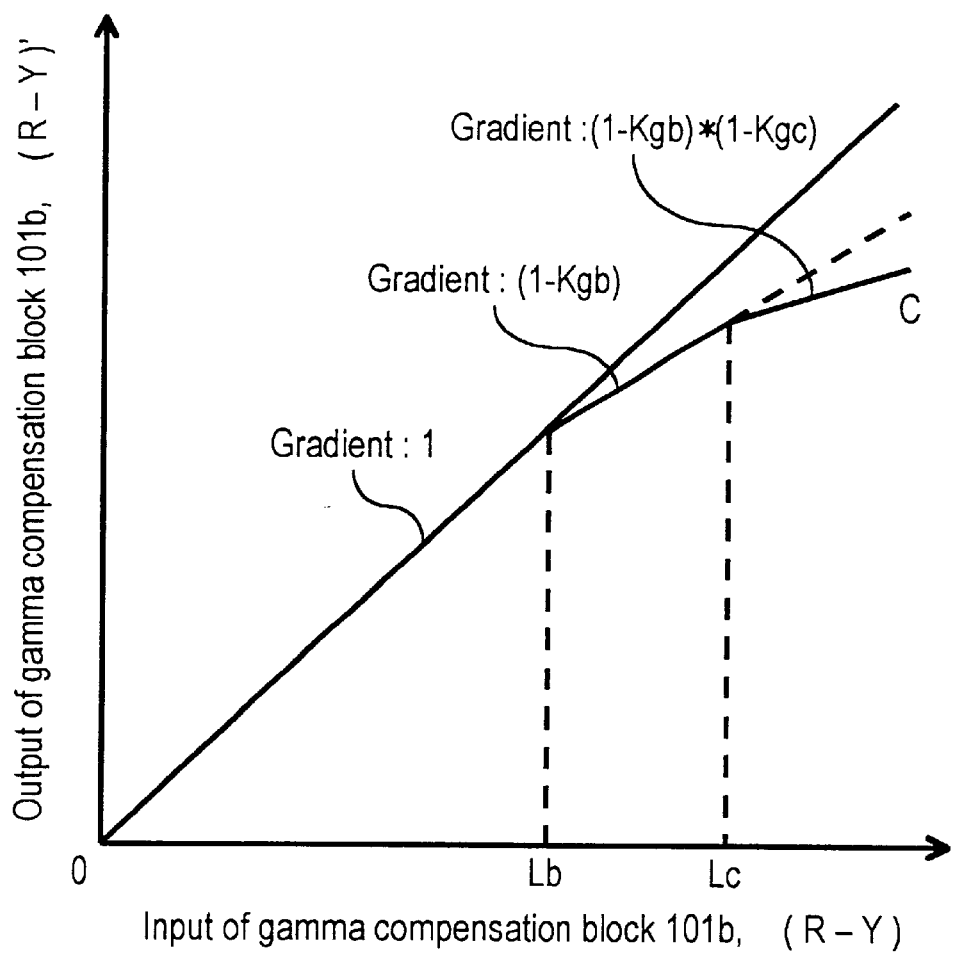
FIG. 5 shows an input-output characteristic of a gamma compensation apparatus in accordance with the second exemplary embodiment of the present invention.

Adders 3b and 3c are supplied with offset Ob and Oc, respectively, similarly to offset Op in the first exemplary embodiment, where offset Ob is smaller than offset Oc. For a picture in which the APL of a luminance signal is larger than Lp, a first bending point is set, for example Lb at first bending point setting block 50b. A color difference signal (R-Y) is input to slice circuit 4b in first compensation value calculation block 51b together with Lb set at first bending point setting block 50b and only a level higher than Lb is taken out, multiplied by Kgb at gain controller 5b and supplied to subtracter 6b. Subtracter 6b subtracts an output of gain controller 5b from the input color difference signal (R-Y) and outputs the subtracted signal. The output characteristic of subtracter 6b against the input color difference signal (R-Y) of first compensation value calculation block 51b is expressed by a bent line having one bending point connecting to lines having gradients 1 and (1-Kgb) for the level of color difference signal (R-Y) higher than Lb, as shown in FIG. 5, as explained in the first exemplary embodiment.

For a picture in which the APL of a luminance signal is larger than Lp, a second bending point is set, for example Lc at second bending point setting block 50c. An output of subtracter 6b is supplied to slice circuit 4c of second compensation value calculation block 51c together with Lc set at second bending point setting block 50c and only a level higher than Lc is taken out, multiplied by Kgc at gain controller 5c and supplied to subtracter 6c. Subtracter 6c subtracts the output of gain controller 5c from the output of subtracter 6b and outputs the subtracted signal.

Because subtracter 6c subtracts an output of slice circuit 4c multiplied by Kgc from the output of first compensation value calculation block 51b for a level of input color difference signal (R-Y) higher than Lc, the output of subtracter 6c is a product of the input color difference signal (R-Y) multiplied by (1-Kgb)*(1-Kgc). After all, the input-output characteristic of gamma compensation block 101b is expressed by a bent line C having two bending points connecting three lines with gradients 1, (1-Kgb) and (1-Kgb)*(1-Kgc), as shown in FIG. 5. The input color difference signal (R-Y) is output from the apparatus as a color difference signal (R-Y)' gamma compensated by a characteristic shown in FIG. 5.

Thus, the tone crush of a red part is prevented and color reproducibility of a red part with high saturation in a displayed picture can be improved by suppressing the level of a red part with high saturation of a color difference signal (R-Y).

Third exemplary embodiment

Figure 6:
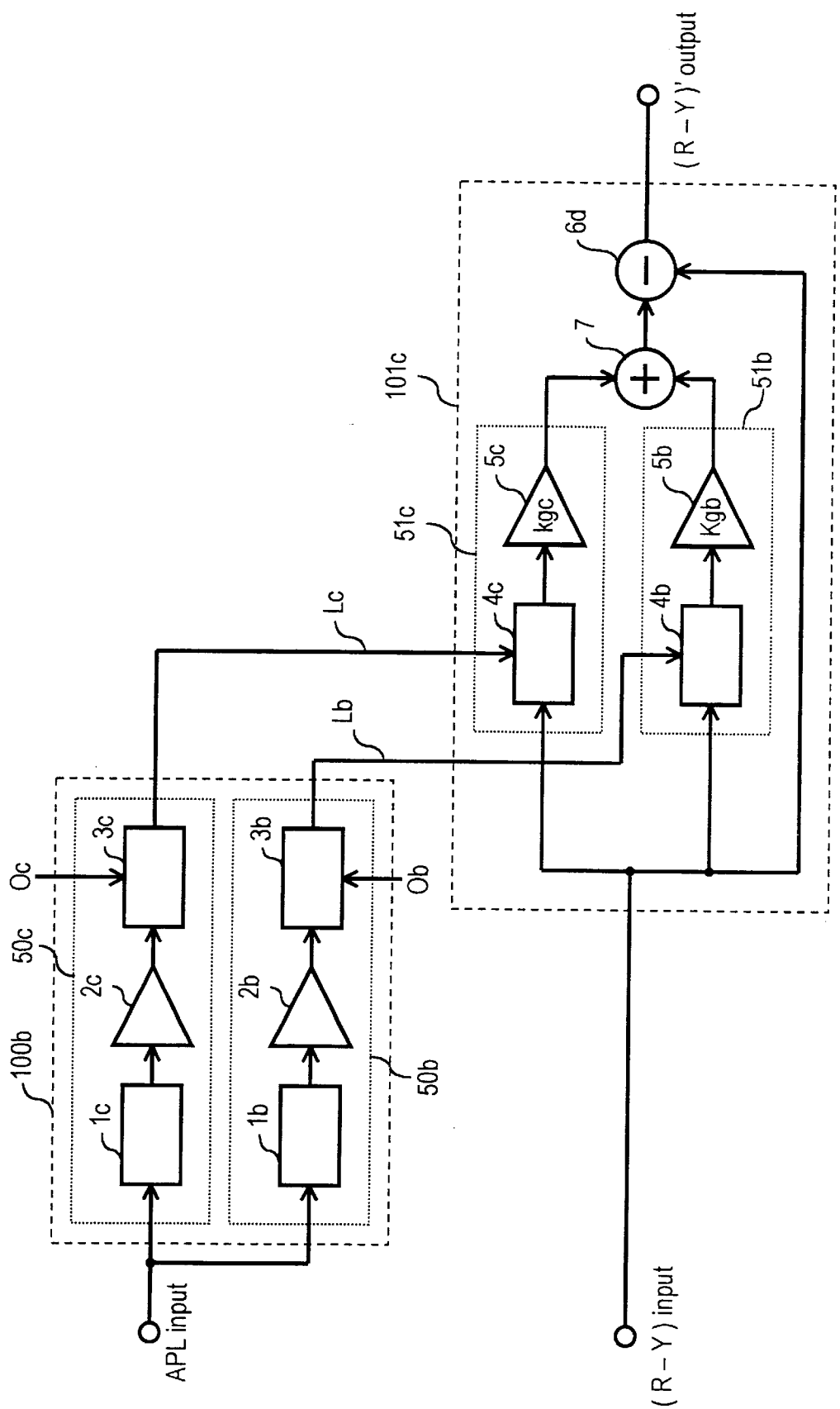
FIG. 6 is a block diagram of a gamma compensation apparatus in accordance with a third exemplary embodiment of the present invention (in the case of a bent line having two bending points in a gamma compensation characteristic).

A block diagram of a gamma compensation apparatus in accordance with a third exemplary embodiment of the present invention is shown in FIG. 6. A bending point setting block 100b is the same as that of the second exemplary embodiment. A gamma compensation block 101c is composed of first and second compensation value calculation blocks 51b and 51c, respectively, an adder 7 and a subtracter 6d. First and second compensation value calculation blocks 51b and 51c, respectively, work in the same way as those in the second exemplary embodiment. Although first and second compensation value calculation blocks 51b and 51c are connected in cascade in the second exemplary embodiment, they are connected in parallel in the third exemplary embodiment.

Figure 7:
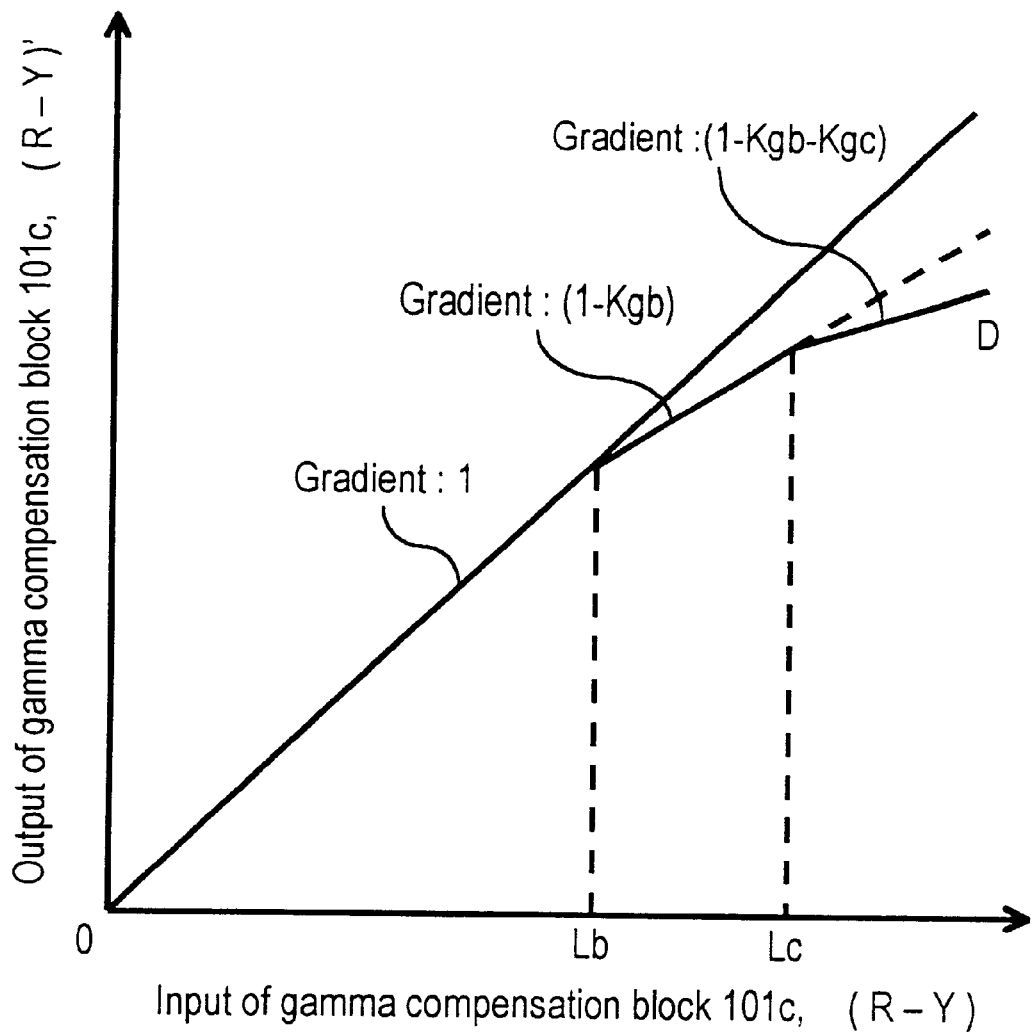
FIG. 7 shows an input-output characteristic of a gamma compensation apparatus in accordance with the third exemplary embodiment of the present invention.

A color difference signal (R-Y) is input to both first and second compensation value calculation blocks 51b and 51c, respectively, which outputs are added at adder 7. Subtracter 6d subtracts the output of adder 7 from the input color difference signal (R-Y). Because the outputs of first and second compensation value calculation blocks 51b and 51c, respectively, are the value corresponding to 0 (zero) at the level of color difference signal (R-Y) lower than Lb, the output of adder 7 is 0 and the input color difference signal (R-Y) is output as it is. That is, the gradient of the input-output characteristic of the gamma compensation block 101c is 1. At the level of color difference signal (R-Y) higher than Lb and lower than Lc, a signal is output from slice circuit 4b but the output of slice circuit 4c is 0. Accordingly, the gradient of the input-output characteristic of gamma compensation block 101c is (1-Kgb) at this level. At the level of color difference signal (R-Y) higher than Lc, both slice circuits 4b and 4c output each signal, the sum of both outputs is subtracted from the input color difference signal (R-Y) at subtracter 6d and as a result, the gradient of the input-output characteristic of gamma compensation block 101c is (1-Kgb-Kgc) at the level higher than Lc. After all, the input-output characteristic of gamma compensation block 101c in accordance with the third exemplary embodiment is expressed by a bent line D having two bending points connecting three lines with gradients 1, (1-Kgb) and (1-Kgb-Kgc) in order, as shown in FIG. 7, similar to that in the second exemplary embodiment.

Fourth exemplary embodiment

Figure 8:
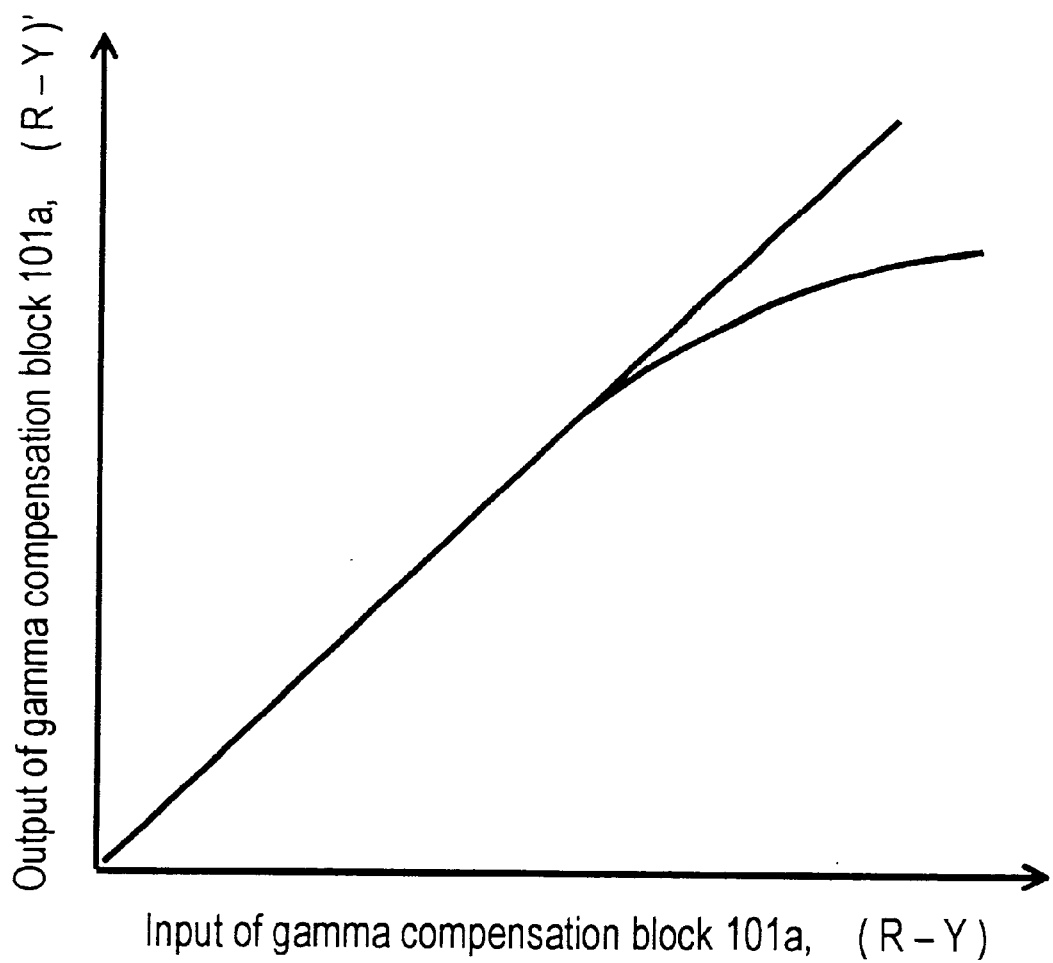
FIG. 8 is a block diagram of a gamma compensation apparatus in accordance with a fourth exemplary embodiment of the present invention (in the case of a continuously curved line in a gamma compensation characteristic).

A similar effect is obtained by replacing gain controller 5a by a multiplier outputting a value proportional to a square of an input signal level. An input-output characteristic in this case is shown in FIG. 8. The gamma compensation part of the characteristic is a smoothly varying curve, different from those of the previous exemplary embodiments.

Thus, the tone crush of a red part is prevented and color reproducibility of a red part with high saturation in a displayed picture can be improved by suppressing the level of a red part with high saturation of a color difference signal (R-Y).

INDUSTRIAL APPLICABILITY

Thus, according to the present invention, in a color television receiver, tone crush at a red part is prevented and color reproducibility of a red part having high saturation can be improved by suppressing the level of a high saturation part of a color difference signal (R-Y) according to the APL value of a luminance signal.

Reference Numerals 1a, 1b, 1c . . . high APL detection circuit
2a, 2b, 2c . . . gain controller
3a, 3b, 3c . . . adder
50a, 50b, 50c . . . bending point calculation block
100a, 100b . . . bending point setting block
4a, 4b, 4c . . . slice circuit
5a, 5b, 5c . . . gain controller
7 . . . adder
6a, 6b, 6c . . . subtracter
51a, 51b, 51c . . . compensation value calculation block
101a, 101b, 101c . . . gamma compensation block

What is claim is:

1. A gamma compensation apparatus comprising:
bending point setting means for deternnining at least one bending point according to an average picture level and outputting a bending point signal corresponding to said bending point, said bending point setting means comprising bending point calculation means for setting said bending point to a designated point if said average picture level is lower than a designated level and varying said bending point according to said average picture level if said average picture level is higher than said designated level, and
compensation means for providing gamma compensation if said average picture level is higher thian said bending point,
wherein said compensation means is for inputting said bending point signal and for calculating a compensation value
which is subtracted from a color difference signal,
wherein said bendins point calculation means comprises:
a high APL (average picture level) detection circuit slicing said average picture level at said designated level and for detecting if said average picture level is higher than said designated level,
a first gain controller for controlling a gain of an output signal of said high APL detection circuit, and
an adder for adding a designated offset to an output signal of said first gain controller.

2. A gamma compensation apparatus as defined in claim 1, wherein said compensation va lue is one of a plurality of compensation values and
said compensation means comprises:
an adder for calculating a sum of said compensation values;
a subtracter for subtracting an output of said adder from said color difference signal and outputting the subtracted signal.

3. A gamma compensation apparatus comprising:
bending point setting means for determining at least one bending point according to an average picture level and outputting a bending point signal corresponding to said bending point, said bending point setting means comprising bending point calculation means for setting said bending point to a designated point if said average picture level is lower than a designated level and varying said bending point according to said average picture level if said average picture level is higher than said designated level,
compensation means for providing gamma compensation said average picture level is higher than said bending point,
wherein said compensation means comprises:
a slice circuit for slicing said color difference signal by using the output of said bending point setting means and outputting the sliced signal,
a second gain controller for adjusting the output signal level of said slice circuit and outputting the level adjusted signal,
wherein said bending point calculation means comprises:
a high APL (average picture level) detection circuit slicing said average picture level at said designated level and for detecting if said average picture level is higher than said designated level, a first gain controller for controlling a gain of an output signal of said high APL detection circuit, and an adder for adding a designated offset to an output signal of said first gain controller.

4. A gamma compensation apparatus as defined in claim 3, wherein said second gain controller multiplies the input signal by a designated coefficient and outputting the product.

5. A gamma compensation apparatus as defined in claim 3, wherein said second gain controller has an input-output characteristic expressed by a curve which is convex upward.

6. A gamma compensation apparatus as defined in claim 5, wherein said second gain controller outputs a value proportional to the n-th power of the input signal level (n is not less than 1).

* * * * *

UNITED STATES PATENT AND TRADEMARK OFFICE
CERTIFICATE OF CORRECTION

PATENT NO. : 6,215,529 B1  
DATED : April 10, 2001  
INVENTOR(S) : Sugimoto et al.

Page 1 of 1

It is certified that error appears in the above-identified patent and that said Letters Patent is hereby corrected as shown below:

<u>Title page,</u>  
Item [56] References Cited, insert:  
U.S. PATENT DOCUMENTS

| | | |
|---|---|---|
| 5,185,656 | 2/1993 | Yamamoto |
| 5,221,963 | 6/1993 | Hashimoto et al. |
| 5,357,279 | 10/1994 | Nakamura et al. |
| 4,499,486 | 2/1985 | Favreau et al. |
| 4,602,277 | 7/1986 | Guichard |
| 5,479,204 | 12/1995 | Iwamatsu |

FOREIGN PATENT DOCUMENTS

| | | |
|---|---|---|
| 0 613 294 | 8/1994 | (EP) |
| WO 95/28796 | 10/1995 | (PCT) |
| 0 647 069 | 4/1995 | (EP) |

OTHER DOCUMENTS  
Search report corresponding to application no. PCT/JP98/00911 dated June 26, 1998.

Signed and Sealed this

Second Day of April, 2002

Attest:

Attesting Officer

JAMES E. ROGAN  
Director of the United States Patent and Trademark Office